United States Patent [19]

Garter et al.

[11] Patent Number: 5,115,628
[45] Date of Patent: May 26, 1992

[54] HEIGHT CONTROL SYSTEM FOR A COTTON HARVESTER

[75] Inventors: Lee F. Garter, Western Springs; G. Neil Thedford, Naperville, both of Ill.

[73] Assignee: J. I. Case Company, Racine, Wis.

[21] Appl. No.: 626,022

[22] Filed: Dec. 12, 1990

[51] Int. Cl.⁵ ............................................. A01D 46/08
[52] U.S. Cl. .................................... 56/10.2; 56/15.2; 56/28; 56/DIG. 10
[58] Field of Search ................ 56/28, 10.2, 10.4, 13.5, 56/15.1, 15.2, 29, 30, DIG. 3, DIG. 10, DIG. 15

[56] References Cited

U.S. PATENT DOCUMENTS

| | | |
|---|---|---|
| 3,464,190 | 9/1969 | Lester et al. ............... 56/11.9 |
| 3,611,681 | 10/1971 | Blanton et al. .............. 56/11.9 |
| 3,643,407 | 2/1972 | Hubbard et al. ............. 56/10.2 |
| 4,229,931 | 10/1980 | Schlueter et al. ............ 56/10.2 |
| 4,307,560 | 12/1981 | Swanson ..................... 56/11.9 |
| 4,327,540 | 5/1982 | Swanson ..................... 56/11.9 |
| 4,335,561 | 6/1982 | Swanson et al. .............. 56/10.2 |

OTHER PUBLICATIONS

J. I. Case Corporation Operators Manual dated May, 1986, p. 73.

J. I. Case Corporation Parts Catalog Issued Jun. 1990, pp. 9A-78 and 9A-79.

*Primary Examiner*—Terry Lee Melius
*Attorney, Agent, or Firm*—Dressler, Goldsmith, Shore, Sutker & Milnamow, Ltd.

[57] ABSTRACT

An improved height control system for adjusting the elevation of a harvesting unit supportd for vertical movement on a cotton harvester. The height control system includes a signal receiving apparatus movable within a range of movement and arranged in combination with a lift mechanism for adjusting the elevation of the harvesting unit. A signal transmitting mechanism carried on the harvesting unit for ground engagement is connected to the signal receiving apparatus for causing the lift mechanism to effect harvesting unit elevation correlated with vertical movement of the signal transmitting mechanism relative to the harvesting unit. A linkage assembly interconnects the signal receiving apparatus and signal transmitting mechanism. The linkage assembly includes a lost motion mechanism for permitting relative movement between the signal transmitting mechanism and signal receiving apparatus following the signal receiving apparatus reaching on extreme limit of its travel thereby allowing for continued travel of the signal transmitting mechanism beyond a normal range of travel and thereby inhibiting damage to the component parts of the height control system.

12 Claims, 4 Drawing Sheets

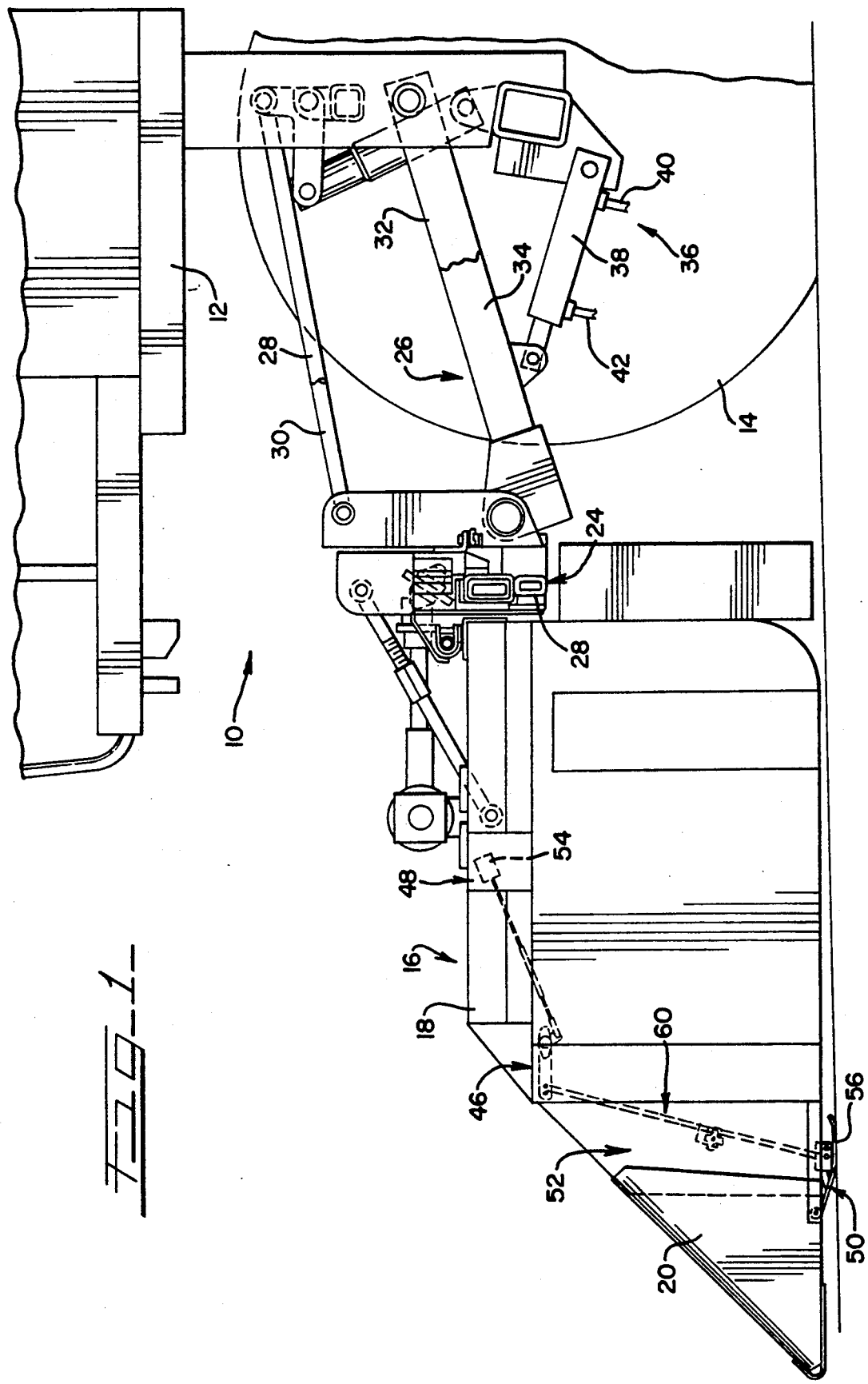

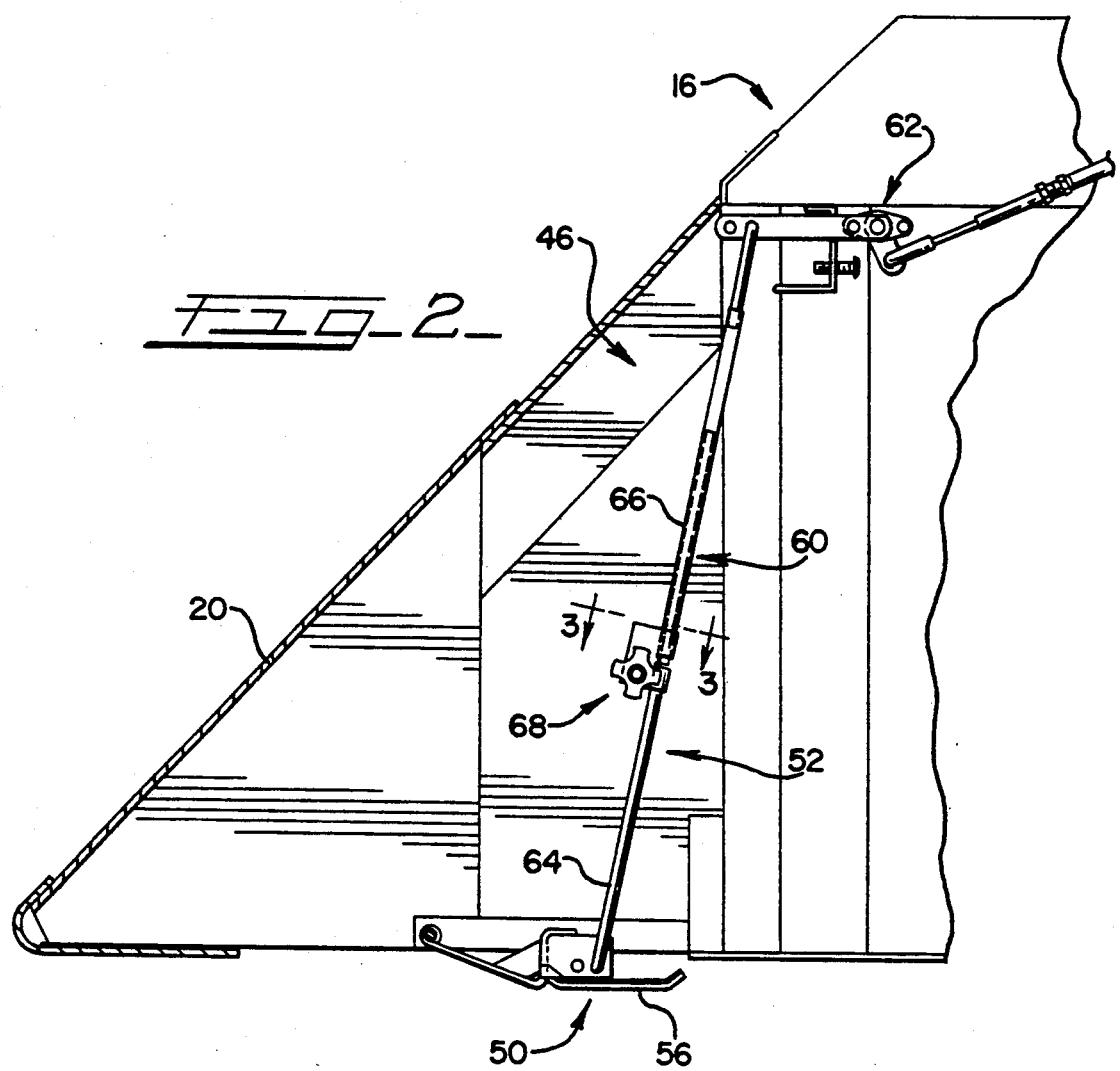
Fig_2_
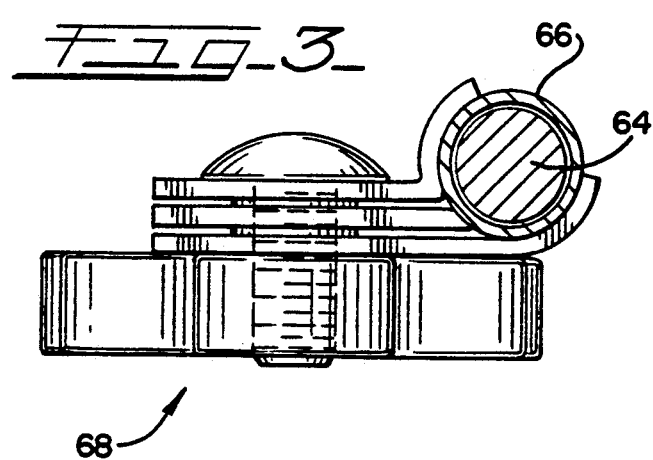
Fig_3_

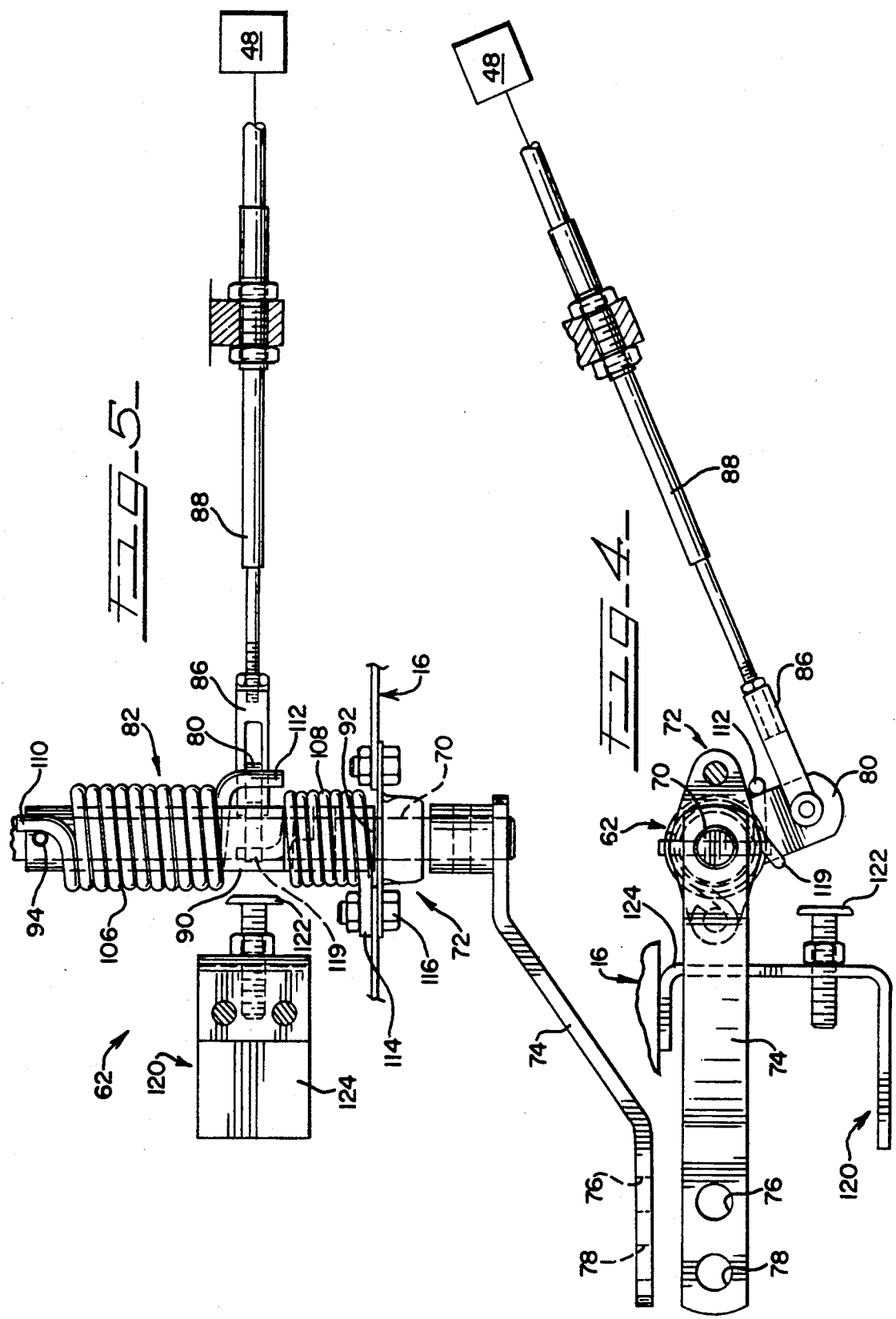

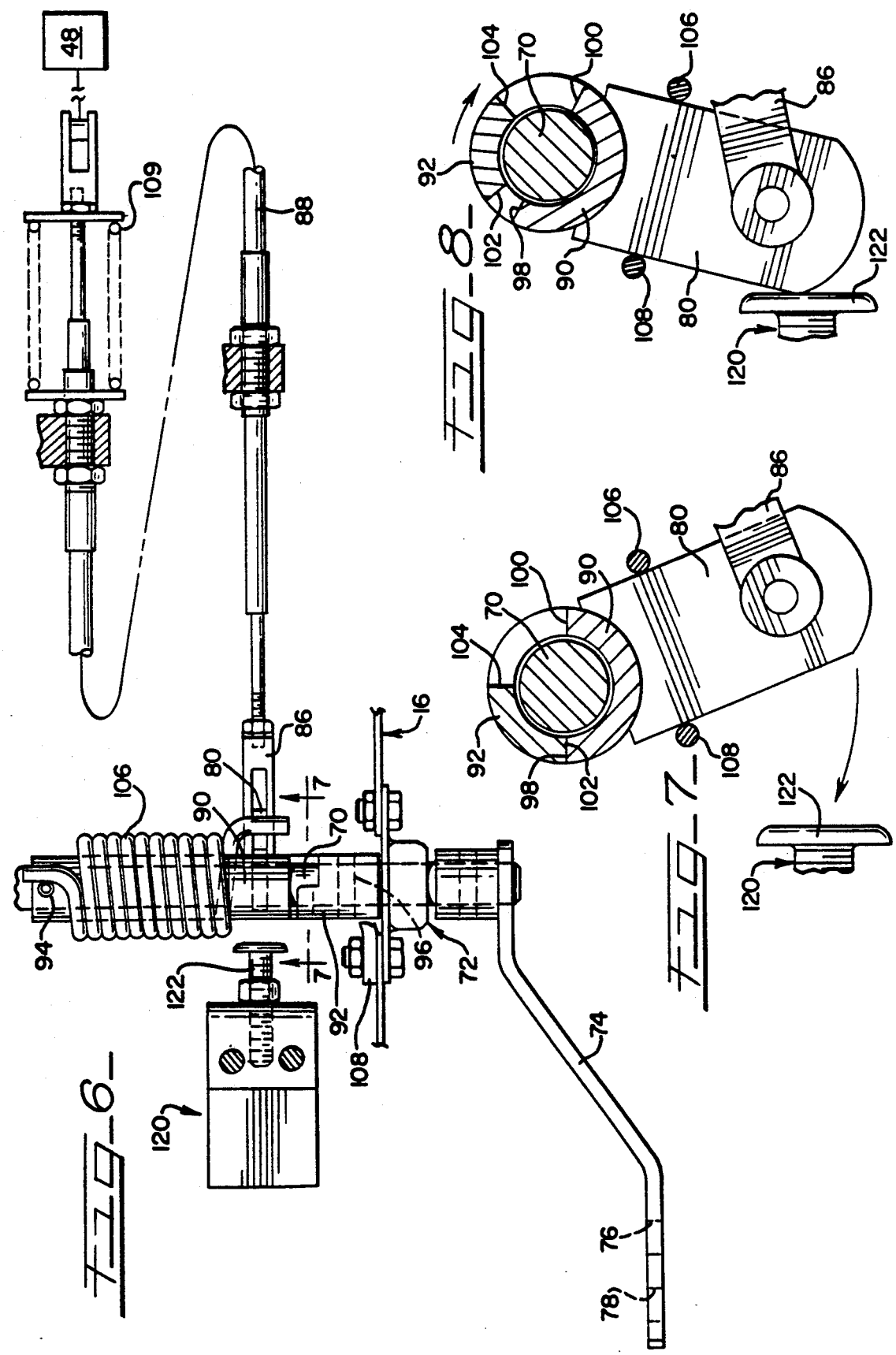

HEIGHT CONTROL SYSTEM FOR A COTTON HARVESTER

FIELD OF THE INVENTION

The present invention generally relates to cotton harvesters and, more particularly, to an improved harvesting unit height control system for a cotton harvester.

BACKGROUND OF THE INVENTION

Conventional cotton harvesters include two or more harvesting units commonly supported for vertical movement on a fore-and-aft wheeled frame of the harvester. Each harvesting unit includes a harvesting assembly defining a plant passage and a harvesting mechanism arranged within the housing. As the cotton harvester is driven across the cotton field, a row of cotton plants passes through the passage, and the harvesting mechanism removes the cotton therefrom. Cotton grows along the entire height of the cotton plant. At the lower end, the cotton grows barely off the ground and sometimes on the ground. The harvesting units, therefore, follow as close to the ground as possible so as to pick all of the cotton from the plants.

The ground over which the harvester is driven is usually uneven. Accordingly, if the harvesting unit is set for a lowermost point of depression on the ground, stalk lifters extending from a forward end of the harvesting unit will tend to "dig into" high points of ground contour. As the harvester is driven across the field, the wheels on the harvester frame ride between adjacent rows of cotton plants. In softer muddy conditions, the wheels of the harvester furthermore deform the field into slight recesses and valleys or raised ridges. As will be appreciated, proper positioning of the harvesting unit relative to the ground contour is further complicated in such undulating field conditions.

To optimize efficiency during the harvesting operation, cotton harvesters are known to include a harvesting unit height control system for automatically controlling the height of the harvesting unit relative to the ground contour. The elevation of the harvesting unit is primarily controlled by a lift mechanism actuated in accordance with ground contours. Variations of the ground contour are sensed by a ground engaging element, such as a shoe, mounted on the harvesting unit in a manner to press on the ground and be positionally displaced in response to variations of the ground contour profile.

The sensing shoe of the height control system is connected to a control valve of a hydraulic system connected to the lift mechanism. The control valve controls operation of the lift mechanism and, thereby, elevation of the harvesting units. As is conventional, the control valve moves from a "Neutral" position to either "Lower" or "Lift" positions in response to vertical displacement of the ground engaging element or shoe. A conventional control valve includes a reciprocal spool valve movable through a predetermined range of travel.

A vertically adjustable linkage assembly typically interconnects the ground engaging element and the control valve. The vertical adjustment of the linkage assembly allows the "Neutral" position of the ground engaging element or shoe to be vertically adjusted relative to the harvesting unit and within a limited range of movement.

To avoid maintaining the hydraulic system of the harvester "active", the harvesting units are often set upon the ground when there is a "break" or upon completion of a harvesting operation. A major problem encountered with known height control systems is that the "Neutral" position of the sensing element or shoe may be vertically positioned relative to the harvesting unit such that vertical displacement of the shoe after the harvesting unit is set upon the ground is greater than the displacement allowed for the valve spool of the control valve. As will be appreciated, overtravel of the shoe beyond the operating range of the spool valve can result in damage to the components of the height control system. Accordingly, the "Neutral" position adjustment of known height control systems is severely limited.

To promote proper operation of the lift mechanism, the height control system must be responsive to changes in ground contours. In this regard, another problem with known height control systems involves the weight of the linkage assembly used to interconnect the ground engaging shoe with the control valve. Although the shoe of the height adjusting system can properly operate on a firm portion of the field, the bulkiness or weight of the linkage assembly detracts from the responsiveness of the sensing shoe and tends to cause the shoe to "dig in" at soft portions of the field with attendant undesirable consequences.

SUMMARY OF THE INVENTION

In view of the above, and in accordance with the present invention, there is provided an improved height control system for adjusting the elevation of a harvesting unit supported for vertical movement on a frame of a cotton harvester. The height control system of the present invention includes a signal receiving apparatus movable within a range of movement and which is arranged in combination with a hydraulic lift mechanism for adjusting the elevation of the harvesting unit. A signal transmitting mechanism is carried on the harvesting unit for ground engagement and is connected to the signal receiving apparatus for causing the lift mechanism to effect harvesting unit elevation correlated with vertical movement of the signal transmitting mechanism relative to the harvesting unit. The signal receiving apparatus and signal transmitting mechanism are interconnected by a linkage assembly which includes a lost motion mechanism which permits the signal transmitting mechanism to move relative to and following the signal receiving apparatus reaching an extreme limit of its predetermined range of movement and without causing the lift mechanism to effect harvesting unit elevation.

In a preferred form of the invention, the signal receiving apparatus includes a control valve assembly arranged in combination with the hydraulic lift mechanism of the harvester. The control valve assembly is movable between any of three operational positions including "Neutral," "Lift," and "Lower" and includes a spool valve to control fluid flow between a pressurized hydraulic system on the harvester and the lift mechanism. The height control system further includes a stop assembly for limiting movement of the control valve thereby inhibiting damage to the height control system.

The signal transmitting mechanism preferably includes a vertically movable ground engaging element or shoe carried by the harvesting unit. The ground engaging element engages the ground surface and is operable to position the control valve in response to the ground contour to cause the lift mechanism to effect harvesting unit elevation correlated with the vertical movement of the ground engaging element relative to the harvesting unit.

The linkage assembly used to interconnect the signal transmitting mechanism and the signal receiving apparatus is vertically adjustable to position the ground engaging element relative to the harvesting unit thereby effecting the lowermost elevation of the harvesting unit relative to the ground surface. The linkage assembly preferably includes a pair of vertically extending telescopic shaft sections which are adjustably interconnected to allow vertical adjustability of the ground engaging element relative to the "Neutral" position of the control valve assembly. The linkage assembly is spring biased for transmitting movements of the ground engagement element reflective of changes in vertical location thereof relative to the harvesting unit to positional movements of the control valve assembly.

The lost motion mechanism of the linkage assembly preferably includes a rockshaft which is rotatable about a fixed axis on the harvesting unit. An arm, which is connected to the control valve assembly, is freely rotatable about the axis defined by the rockshaft. A spring mechanism which is responsive to rocking movement of the rockshaft positions the arm and thereby the control valve assembly in response to vertical movement of the ground engaging element. In a preferred form, a pair of timing collars are arranged in axial alignment on the shaft and are interconnected to the spring mechanism. The spring mechanism preferably includes a pair of torsional springs which likewise biases the linkage assembly.

The lost motion mechanism allows extended travel of the ground engaging element and the linkage assembly relative to and beyond the normal operating range of the control valve assembly. During normal operation, vertical displacement of the ground engaging element is transmitted through the torsion springs to the arm and thereby to the control valve. When the ground engaging element "overtravels" (the harvesting unit is set on a flat surface forcing the ground engaging element to travel fully upward), the torsional spring of the lost motion mechanism will "wind up" such as to not overload the other mechanical parts of the system.

During operation of the harvester, the spring mechanism reacts as if there was a solid link connection to the control valve assembly until an initial spring torque is overcome. Upon movement of the sensing element beyond its normal range of travel and after the initial spring torque of the spring mechanism is overcome, the lost motion mechanism permits relative movement between the control valve and the signal transmitting mechanism thereby inhibiting damage to the component parts of the height control system. The ability to compensate for overtravel or movement of the ground engaging element beyond its normal range of travel allows the other mechanical parts of the height control system to be designed lighter and less costly in that less load is placed upon the parts during an overtravel condition of the sensing assembly.

Numerous other features and advantages of the present invention will become readily apparent from the following detailed description, the accompanying drawings, and the appended claims.

BRIEF DESCRIPTION OF THE DRAWINGS

FIG. 1 is a fragmentary side elevational view of the cotton harvester incorporating principles of the present invention;

FIG. 2 is an enlarged side elevational view of a height adjusting system according to the present invention;

FIG. 3 is a sectional view taken along line 3—3 of FIG. 2;

FIG. 4 is an enlarged side elevational view of a portion of the height control system of the present invention;

FIG. 5 is a plan view of FIG. 4;

FIG. 6 is a plan view substantially similar to FIG. 5 with a return spring removed for purposes of clarity;

FIG. 7 is a sectional view taken along line 7—7 of FIG. 6; and

FIG. 8 is a sectional view substantially similar to FIG. 7 showing an arm moved to a second position.

DETAILED DESCRIPTION OF THE PRESENT INVENTION

While the present invention is susceptible of embodiment in various forms, there is shown in the drawings a presently preferred embodiment hereinafter described with the understanding that the present disclosure is to be considered as an exemplification of the invention and is not intended to limit the invention to the specific embodiment illustrated.

Referring now to the drawings, wherein like reference numerals indicate like parts throughout the several views, there is shown a self-propelled cotton harvester which is depicted only fragmentarily and is seen as represented in its entirety in FIG. 1 by reference numeral 10. Cotton harvester 10 has a fore-and-aft extending frame 12 mounted on a pair of ground engaging front wheels 14. A pair of steerable rear wheels (not shown) provide the harvester with proper direction.

One or more harvesting units 16 are commonly supported at a forward end of frame 12. Each harvesting unit is a conventional structure including a fore-and-aft extending housing assembly 18 which rotatably supports a harvesting mechanism (not shown) and other associated mechanisms for stripping or picking cotton from the plants as the harvester is driven across the field. A pair of stalk lifters 20 extend forwardly from a housing assembly 18 for guiding the cotton plants through a plant passage defined by the housing assembly 18.

A mounting and supporting system, indicated generally by reference numeral 24 in FIG. 1, is provided for supporting the harvesting units for vertical movement between lowered and raised elevational positions. The mounting and supporting system 24 preferably includes a lift assembly 26 and an elongated tool bar structure 28 connected to the lift assembly.

Co-assigned U.S. Pat. No. 5,010,718 and entitled "METHOD AND APPARATUS FOR SUPPORTING HARVESTING UNITS OF A COTTON HARVESTER" provides a more detailed explanation of the mounting and supporting system 24 and is incorporated herein in its entirety by reference. Suffice it to say, the lift assembly operates as a parallelogram type linkage which is pivotally connected to and extends forwardly from frame 12 of the cotton harvester. As illustrated in FIG. 1, the lift assembly 26 includes a pair of laterally spaced upper tension arms 28, 30 extending generally parallel to a pair of laterally spaced lower lift arms 32, 34. The tension arms 28 and 30 have an effective length which is approximately equal to that of the lift arms 32 and 34, respectively, and, therefore, the harvesting units connected thereto are maintained in a generally level attitude during field operation as they are moved between lower and raised elevational positions. The harvesting units are preferably individually connected to the tool bar structure 28 which, as illustrated, is suitably connected to the lift assembly 26.

A pressurized hydraulic system 36 is preferably provided for adjusting the elevation of the harvesting units. As shown in FIG. 1, the hydraulic system includes hydraulic lift means 38 preferably in the form of linearly distendable hydraulic cylinders connected between the frame 12 and the harvesting unit 16. Conduits 40, 42 connect the hydraulic system 36 to the lift means 38.

During a harvesting operation, operation of the lift means 38 and thereby the harvesting elevation of the harvesting units 16 is automatically controlled by a harvesting unit height sensing system generally indicated by reference numeral 46. As shown in FIG. 1, the height sensing system 46 includes a signal receiving assembly 48, a signal transmitting mechanism 50, and a linkage assembly 52 interconnecting the signal receiving assembly 48 and the signal transmitting mechanism 50.

In the illustrated embodiment, the signal receiving assembly 48 includes a hydraulic control valve assembly 54 arranged in combination with the hydraulic system 36 for influencing the flow of pressurized hydraulic fluid to the lift means 38 and thereby adjusting the elevation of the harvesting units. The control valve assembly can be located on the housing 18 or frame 12 and is movable through a range of movement including three operational positions including "Lift," "Neutral," and "Lower" to control fluid flow between the hydraulic system 36 and the lift means 38. In a most preferred form of the invention, the control valve assembly 54 comprises a spool valve which controls fluid flow as a function of its position.

The signal transmitting mechanism 50 is preferably of the type disclosed in co-assigned and co-pending U.S. patent application Ser. No. 07/628,208 filed Dec. 14, 1990 and entitled HARVESTING UNIT HEIGHT CONTROL FOR A COTTON HARVESTER. In a preferred form of the invention, the signal transmitting mechanism 50 is carried on the harvesting unit for ground engagement and is connected to the signal receiving assembly 48 for causing the lift means 38 to effect harvesting unit elevation correlated with vertical movement of the signal transmitting mechanism 50 relative to the harvesting unit.

In a most preferred form of the invention, the signal transmitting mechanism includes a ground contour sensing shoe or element 56 pivotally connected to the harvesting unit. The ground engaging element 56 is responsive to the ground contour and is operable to position control valve assembly 48 within its range of movement to effect harvester unit elevation correlated with the vertical movement of the ground engaging element relative to the harvesting unit.

The linkage assembly 52 interconnects the control valve assembly 48 and the ground contour sensor assembly 50. As shown, in FIG. 2, the linkage assembly 52 includes vertically adjustable linkage 60 and a lost motion mechanism 62 which is connected to the control valve assembly 48.

Linkage 60 can be vertically adjusted to position the signal transmitting mechanism 50 relative to the harvesting unit and to the "Neutral" position of the control valve assembly 48 thereby affecting a lowermost elevation of the harvesting unit relative to the ground surface. In the illustrated embodiment, linkage 60 includes a pair of vertically extending telescopic shaft sections 64 and 66 which are adjustably interconnected to each other. As shown in FIG. 3, a releasable clamping mechanism 68 is provided for interconnecting the shaft sections 64 and 66 in vertically adjusted relation to each other. As shown, the lowermost end of shaft section 64 is connected to the signal transmitting mechanism 50. The uppermost end of shaft section 66 is connected to the lost motion mechanism 62.

The lost motion mechanism 62 resiliently positions the control valve assembly 48 and the signal transmitting mechanism 50 during operation of the harvester. Moreover, the lost motion mechanism 62 permits the shoe or sensing element 56 of mechanism 50 to vertically move relative to control valve assembly 48 following the valve 54 reaching an extreme limit of its predetermined range of travel thereby inhibiting damage to the component parts of the height control system and without causing the lift means to effect harvesting unit elevation.

In the preferred embodiment, and as shown in FIGS. 4 and 5, the lost motion mechanism 62 is carried on the harvesting unit and includes a laterally elongated rockshaft 70 which is rotatably supported about a fixed axis by a stationary support bearing assembly 72. The rockshaft 70 has a fore-and-aft extending crank arm 74 extending therefrom. The free end of crank arm 74 defines a pair of laterally spaced apertures 76 and 78 which accommodate and allow a portion of shaft section 66 (FIG. 2) to be releasably connected thereto. The lost motion mechanism 62 further includes an arm 80 which is connected to the control valve assembly 48 and is freely rotatable about the rockshaft 70. A spring mechanism 82 positions arm 80 and thereby the control valve assembly 48 in response to vertical movement of the ground contour sensor assembly 50. In the illustrated embodiment, arm 80 is connected to the valve assembly 48 through a clevis 86 and cable arrangement 88.

The lost motion mechanism 62 is configured to permit extended movement of the signal transmitting mechanism 50 beyond the range of movement of valve assembly 48. That is, after the valve assembly 48 reaches an extreme limit of its predetermined path of travel, the sensing shoe or element 56 can continue to move with respect thereto. In a preferred form, and as seen in FIG. 6, the lost motion mechanism further includes a pair of axially aligned and adjacent timing collars 90 and 92 arranged about rockshaft 70. In the illustrated embodiment, arm 80 is fixed to and radially extends from collar 90. Collar 90 is free to rotate about shaft 70 and pin 96 connects collar 92 to shaft 70.

Adjacent ends of timing collars 90 and 92 are interconnected to each other in a manner allowing relative rotational movement therebetween. As shown in FIGS. 7 and 8, timing collar 90 has a 180° cutout which defines diametrically opposed stopping surfaces 98 and 100. Similarly, timing collar 92 has a 270° cutout which defines stopping surfaces 102 and 104.

Spring mechanism 82 transmits movements of the ground engaging element 56 reflective of changes in vertical location thereof relative to the harvesting unit to positional movements of the control valve assembly 48 and allows travel of the sensing element 56 and linkage 60 beyond the normal operating range of the control valve assembly 48.

Returning to FIG. 5, spring mechanism 82 preferably includes a torsional overtravel spring 106 and a torsional return spring 108 which combine to position arm 80 and thereby the valve assembly 48. As shown, a free end 110 of torsion spring 106 is connected to rockshaft 70 by pin 94 radially extending from the shaft 70. An opposite end 112 of torsion spring 106 engages with one side of and urges arm 80 in a clockwise rotational direction about rockshaft 70. A free end 114 of return spring 108 is secured against rotation by fastener 116 used to mount the support bearing 72 to the harvesting unit 16. An opposite end 119 of return spring 108 engages an opposite side of and urges arm 80 in a counterclockwise direction about rockshaft 70.

An additional spring 109 preferably in the form of a compression spring may be used in lieu of torsional spring 108 to remove slack from the cable arrangement 88 upon return movement of the shoe 56 to a lower position. Spring 109 could be used on the cable arrangement 88 as shown in FIG. 6 or be incorporated in the control valve assembly 48 acting on the valve spool.

The height control system of the present invention further includes a stop mechanism 120 for limiting movement of the control valve assembly 48. As shown in FIGS. 4 and 5, stop mechanism 120 includes an adjustable limit stop 122 which is positioned in the arcuate path of arm 80. Limit stop 122 is preferably carried by a depending bracket 124 affixed to the harvesting unit 16. As will be appreciated, engagement of arm 80 with limit stop 122 will inhibit further movement of valve assembly 48 beyond a predetermined adjustable position thereby inhibiting damage to the valve assembly 48.

An elevational hold or "Neutral" condition of the harvesting unit relative to the ground surface is predetermined before a harvesting operation is begun and is determined as a function of the conditions at the time of the harvest. The elevational hold or "Neutral" condition for the harvesting unit is set in the following manner. With the spool valve 54 of valve assembly 48 in a "Neutral" position or condition, the lift means 38 is manually operated to vertically position the harvesting unit at a predetermined distance relative to the ground surface. The linkage assembly 60 is then vertically adjusted such that the ground sensor 56 of signal transmitting mechanism 50 is set to engage the ground surface. The upper shaft section 66 of linkage assembly can be releasably accommodated in either recess 76, 78 of crank arm 74. As will be appreciated, the provision of multiple connection points for the linkage assembly mechanically varies ground sensing "sensitivity" of the height control system to suit field conditions.

As will be appreciated from an understanding of the above description, the height control system of the present invention is operable to automatically adjust the elevation of the harvesting unit as the harvester is driven through the cotton field. As the sensor element or shoe 56 of the signal transmitting mechanism 50 is raised by a projection in the ground surface, the vertical movement thereof is transferred to the linkage assembly 60, through mechanism 62, and, ultimately, shifts the control valve assembly 48 to a "Lift" position. Movement or shifting of the control valve assembly 48 is effective to operate the lift means 38 in a manner raising the harvesting unit in response to the projection in the ground surface. Conversely, when the sensing shoe 56 of the signal transmitting mechanism 50 dips into a depression in the ground surface, the vertical displacement of the linkage assembly 60 and movement of mechanism 62 ultimately shifts the control valve assembly 54 to a "Lower" position in a manner operating the lift means 38 to lower the harvesting unit in response to the depression in the ground contour.

It should be appreciated that an initial torque or "windup" is added to the spring mechanism 82 during assembly of the lost motion mechanism 62. As such, during a normal harvesting operation, changes in vertical location of the sensing shoe 56 are transmitted via the spring mechanism 82 to the arm 80 and, ultimately, to the control valve assembly 48 as if there were a solid link connection between the rockshaft 70 and arm 80. The ability of the spring mechanism 82 to transfer changes in vertical location of the sensing element 56 into movement of the control valve assembly 48 remains until the windup torque on the spring mechanism 82 is overcome. As will be appreciated, this allows a lower spring rate to be used in the torsional spring configuration of the spring mechanism. Correspondingly, the mechanical parts of the height control system can be designed lighter and less costly in that not as much load is placed on the mechanical parts of the present system during an overtravel condition of the signal transmitting mechanism 50. As will be appreciated, the return spring 108 or 109 continually places a downward force against the shoe 56 biasing it toward a lowermost position to assure proper function of the height control system. Moreover, the use of the return spring 108 overcomes cable, spool valve, and rockshaft "drag" in the system.

During the normal harvesting operation, the vertical range of movement of the signal transmitting mechanism 50 is normally within the predetermined range of travel of the control valve assembly 48. To avoid having to maintain the hydraulic system of the harvester "active", the harvesting units are frequently lowered into engagement with the ground surface when the harvester 10 is stopped or inactive. Depending upon the location for the "Neutral" position of the shoe or element 56 of the signal transmitting mechanism 50, however, the shoe 56 may be required to move beyond its normal operating range when the harvesting unit is set upon the ground thus moving the control valve assembly 48 to an extreme limit of its predetermined travel. The lost motion mechanism 62 is configured to compensate for movement of the signal transmitting mechanism 50 beyond its normal range of movement and relative to control valve assembly 48 to inhibit damage to the component parts of the height system when such movement occurs.

The timing collars 90 and 92 conjointly move in response to rotation of the rockshaft 70 as the signal transmitting mechanism 50 operates within its normal range of travel. As shown in FIG. 7, during normal operation of the signal transmitting mechanism 50, the return spring 108 normally urges stop surface 102 of timing collar 92 into contact with stopping surface 98 of timing collar 90.

When the shoe or element 56 is moved beyond its normal operating range, the rockshaft 70 continues to rotate. The continual rotation of the rockshaft is compensated for by the timing collar 92 moving in a clockwise direction relative to and through the extended slot provided on the timing collar 90 as illustrated in FIG. 8. Although movement of timing collar 90 is inhibited by stop 122, the overtravel torsion spring 106 connecting rockshaft 70 to arm 80 allows for continued movement of the sensing shoe 56. The ability to allow for continued movement of the shoe 56 beyond its normal operating range protects the component parts of the height control system against damage resulting from overextension of the signal transmitting mechanism 50. Moreover, the lost motion mechanism 62 offers improved performance of the height control system by broadening the range of neutral positions for the signal transmitting mechanism by allowing for movement of the shoe 56 relative to the control valve assembly.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A height control system for adjusting the elevation of a harvesting unit supported for vertical movement on a frame of a cotton harvester, said cotton harvester having a hydraulic system including hydraulic lift means for vertically positioning said harvesting unit, said height control system comprising:

signal receiving means movable within a predetermined range of movement and arranged and in combination with said lift means for adjusting the elevation of said harvesting unit;

signal transmitting means carried on said harvesting unit for ground engagement and connected to said signal receiving means for causing the lift means to effect harvesting unit elevation correlated with vertical movement of said signal transmitting means relative to said harvesting unit; and means for interconnecting said signal receiving means and said signal transmitting means, said interconnecting means including a torsionally biased rock shaft mechanism interposed between said signal transmitting means and said signal receiving means to permit said signal transmitting means to move relative tot and following said signal receiving means reaching an extreme limit of its predetermined range of movement and thereby allowing for continued travel of the signal transmitting means relative to the signal receiving means while inhibiting damage to the height control system.

2. The height control system according to claim 1 wherein said signal transmitting means includes a ground contour sensing shoe pivotally connected to said harvesting unit.

3. The height control system according to claim 1 wherein said interconnecting means includes a linkage assembly which can be vertically adjusted to position the signal transmitting means relative to said harvesting unit thereby effecting the elevation of the harvesting unit relative to the ground surface during operation of the cotton harvester.

4. A height control system for automatically adjusting the elevation of a harvesting unit supported for vertical movement on a frame of a cotton harvester, said cotton harvester further including a hydraulic system connected to lift means for vertically positioning said harvesting unit, said height control system comprising:

control valve means connected to said hydraulic system and arranged in combination with said lift means for adjusting the elevation of said harvesting unit relative to said frame;

ground contour sensing means having a ground engaging element carried by said harvesting unit, said ground engaging element being vertically responsive to the ground contour and operable to move said control valve means within a predetermined range of movement such that the elevation of said harvesting unit is correlated to the vertical movement of the sensing means relative to the harvesting unit; and means for interconnecting said control valve means and said sensing means, said interconnecting means including a lost motion mechanism which permits vertical movement of said ground engaging element relative to said control valve means following movement of said control valve means to an extreme limit within its range of movement thereby inhibiting damage to the height control system.

5. The height control system according to claim 4 further including stop means for limiting movement of said control valve means.

6. The height control system according to claim 4 wherein said lost motion mechanism includes a rockshaft supported for rotatable movement on said harvesting unit in response to vertical movement of said ground engaging element, an arm connected to said control valve means and freely rotatable about said rockshaft, and spring means for positioning said arm and thereby said control valve means in response to vertical movement of said ground engaging element.

7. The height control system according to claim 4 wherein said control valve means comprises a hydraulic valve movable between any of three operational positions including neutral, lift, and lower to control fluid flow between said hydraulic system and said lift means.

8. The height control system according to claim 7 wherein said interconnecting means includes a pair of vertically extending telescopic shaft sections which are adjustably interconnected to allow vertical adjustability of said ground engaging element relative to the neutral position of said hydraulic valve.

9. A height control system for automatically adjusting the elevation of a harvesting unit supported for vertical movement relative to a frame of a cotton harvester, said cotton harvester further including a hydraulic system including lift means for vertically positioning said harvesting unit, said height control system comprising:

positionable control valve means connected to said hydraulic system and arranged in combination with said lift means for adjusting the elevation of said harvesting unit relative to said frame as a function of the position of said valve means relative to a predetermined range of movement thereof;

ground contour sensing means including a vertically movable ground engaging element carried by said harvesting unit, said ground engaging element being responsive to the ground contour and operable to position said valve means to cause the lift means to effect harvester unit elevation correlated with the vertical movement of said ground engaging element relative to said harvesting unit; and linkage means for interconnecting said control valve means and said sensing means, said linkage means including a spring biased mechanism which resiliently positions said control valve means and said sensing means and which allows movement of said sensing means relative to said valve means after said valve means has reached an extreme limit of its predetermined range of movement thereby inhibiting damage to the height control system after said sensing means continues to move relative to said harvesting unit.

10. The height control sensing system according to claim 9 wherein said linkage means includes spring means for transmitting movements of said ground engaging element reflective of changes in vertical location thereof relative to said harvesting unit to positional movements of said valve means.

11. The height control system according to claim 9 wherein said linkage means includes a lost motion mechanism comprised of a rockshaft rotatable about a fixed axis on said harvesting unit and connected to said ground engaging element, an arm connected to said valve means and freely rotatable about said axis, a pair of timing collars arranged in axially alignment on said shaft, and torsional spring means connected to said timing collars and responsive to rocking movement of said rockshaft for positioning said arm and thereby said valve means in response to vertical movement of said ground engaging element.

12. The height control system according to claim 9 wherein said linkage means includes a telescoping linkage assembly which is adjustable to allow the position of said ground engaging element to change relative to a neutral position of said control valve means.

* * * * *